United States Patent
Chien

(10) Patent No.: US 11,509,463 B2
(45) Date of Patent: Nov. 22, 2022

(54) TIMESTAMP-BASED SHARED KEY GENERATION

(71) Applicant: Daniel Chien, Bellevue, WA (US)

(72) Inventor: Daniel Chien, Bellevue, WA (US)

(\*) Notice: Subject to any disclaimer, the term of this patent is extended or adjusted under 35 U.S.C. 154(b) by 194 days.

(21) Appl. No.: 16/888,839

(22) Filed: May 31, 2020

(65) Prior Publication Data

US 2020/0295932 A1    Sep. 17, 2020

(51) Int. Cl.
  *H04L 9/08* (2006.01)
  *H04L 9/40* (2022.01)
  *H04L 7/00* (2006.01)

(52) U.S. Cl.
  CPC .......... *H04L 9/0872* (2013.01); *H04L 7/0008* (2013.01); *H04L 9/0869* (2013.01);
  (Continued)

(58) Field of Classification Search
  CPC . H04L 9/0872; H04L 9/0869; H04L 63/0272; H04L 63/0435; H04L 2463/121;
  (Continued)

(56) References Cited

U.S. PATENT DOCUMENTS

| 6,016,553 A | 1/2000 | Schneider et al. |
| 6,185,678 B1 | 2/2001 | Arbaugh et al. |

(Continued)

FOREIGN PATENT DOCUMENTS

| JP | 2002-514326 | 5/2002 |
| JP | 2006-1087 | 1/2006 |

(Continued)

OTHER PUBLICATIONS

International Search Report and Written Opinion of the International Searching Authority dated Nov. 19, 2020, in International Patent Application No. PCT/US20/48293 filed Aug. 27, 2020, 8 pages.

(Continued)

*Primary Examiner* — Izunna Okeke
(74) *Attorney, Agent, or Firm* — Benedict R. Dugan; Lowe Graham Jones PLLC

(57) ABSTRACT

Techniques for computer security, and more specifically timestamp-based key generation techniques, are described. Some implementations provide a table of key generation processes that is shared as a secret between a first computing system and a second computing system, both of which have synchronized clocks. Both computing systems use the same technique for selecting a key generation process from the table, such as based on a random number generator seeded with a timestamp. Since the computing systems have synchronized clocks, they both select and use the same key generation process, thereby generating the same encryption key without the need to communicate the key from one system to another. Furthermore, both computing systems may synchronize their clocks to a private time server that maintains a clock that runs faster or slower than standard time. Security is maintained by one or more of restricting access to the time server, using secret key generation processes, and/or using a secret random number generator.

17 Claims, 4 Drawing Sheets

(52) U.S. Cl.
CPC ...... *H04L 63/0272* (2013.01); *H04L 63/0435* (2013.01); *H04L 63/101* (2013.01); *H04L 2463/121* (2013.01)

(58) Field of Classification Search
CPC ... H04L 63/205; H04L 2463/081; H04L 9/12; H04L 9/3297
See application file for complete search history.

(56) References Cited

U.S. PATENT DOCUMENTS

| | | |
|---|---|---|
| 6,289,462 B1 | 9/2001 | McNabb et al. |
| 6,502,135 B1 | 12/2002 | Munger et al. |
| 6,654,796 B1 | 11/2003 | Slater et al. |
| 6,687,226 B1 | 2/2004 | Galyas |
| 6,888,834 B1 | 5/2005 | Wood et al. |
| 7,111,163 B1 | 9/2006 | Haney |
| 7,143,175 B2 | 11/2006 | Adams et al. |
| 7,346,770 B2 | 3/2008 | Swander et al. |
| 7,363,494 B2 | 4/2008 | Brainard et al. |
| 7,363,656 B2 | 4/2008 | Weber et al. |
| 7,401,358 B1 | 7/2008 | Christie et al. |
| 7,457,823 B2 | 11/2008 | Shraim et al. |
| 7,461,404 B2 | 12/2008 | Dudfield et al. |
| 7,490,237 B1 | 2/2009 | Morais et al. |
| 7,536,723 B1 | 5/2009 | Bhagwat et al. |
| 7,540,028 B2 | 5/2009 | Ahmed et al. |
| 7,602,731 B2 | 10/2009 | Jain |
| 7,626,940 B2 | 12/2009 | Jain |
| 7,725,936 B2 | 5/2010 | Banerjee et al. |
| 7,797,436 B2 | 9/2010 | Banerjee et al. |
| 7,826,602 B1 | 11/2010 | Hunyady et al. |
| 7,832,009 B2 | 11/2010 | Wang et al. |
| 7,979,889 B2 | 7/2011 | Gladstone et al. |
| 8,161,552 B1 | 4/2012 | Sun et al. |
| 8,423,631 B1 | 4/2013 | Mower et al. |
| 8,495,700 B2 | 7/2013 | Shahbazi |
| 8,621,604 B2 | 12/2013 | Chien |
| 8,788,839 B1 | 7/2014 | Dong et al. |
| 8,813,186 B2 | 8/2014 | Hegg et al. |
| 8,848,608 B1 | 9/2014 | Addepalli et al. |
| 8,950,007 B1 | 2/2015 | Teal et al. |
| 9,015,090 B2 | 4/2015 | Chien |
| 9,172,721 B2 | 10/2015 | Jain |
| 9,264,404 B1 | 2/2016 | Lambert et al. |
| 9,413,783 B1 | 8/2016 | Keogh |
| 9,648,032 B2 | 5/2017 | Davydov et al. |
| 9,654,458 B1 | 5/2017 | Bhaktwatsalam et al. |
| 9,674,145 B2 | 6/2017 | Chien |
| 9,825,911 B1 | 11/2017 | Brandwine |
| 9,838,425 B2 | 12/2017 | Jalan et al. |
| 9,892,284 B2 | 2/2018 | Wachendorf et al. |
| 9,928,151 B1 | 3/2018 | Rodriguez Valadez et al. |
| 10,084,791 B2 | 9/2018 | Chien |
| 10,171,463 B1 | 1/2019 | Wiger |
| 10,250,868 B1 | 4/2019 | Arnold et al. |
| 10,382,436 B2 | 8/2019 | Chien |
| 10,826,912 B2 | 11/2020 | Chien |
| 10,848,489 B2 | 11/2020 | Chien |
| 2002/0049883 A1 | 4/2002 | Schneider et al. |
| 2002/0133721 A1 | 9/2002 | Adjaoute |
| 2002/0188704 A1 | 12/2002 | Gold et al. |
| 2003/0084349 A1 | 5/2003 | Friedrichs et al. |
| 2003/0101357 A1 | 5/2003 | Ronen et al. |
| 2003/0118038 A1 | 6/2003 | Jalava et al. |
| 2003/0149668 A1 | 8/2003 | Lee et al. |
| 2003/0149887 A1 | 8/2003 | Yadav |
| 2003/0149888 A1 | 8/2003 | Yadav |
| 2003/0185395 A1 | 10/2003 | Lee et al. |
| 2003/0188190 A1 | 10/2003 | Aaron et al. |
| 2003/0217289 A1 | 11/2003 | Ammon et al. |
| 2004/0003285 A1 | 1/2004 | Whelan et al. |
| 2004/0068562 A1 | 4/2004 | Tilton et al. |
| 2004/0088537 A1 | 5/2004 | Swander et al. |
| 2004/0123141 A1 | 6/2004 | Yadav |
| 2004/0123157 A1 | 6/2004 | Alagna et al. |
| 2004/0162992 A1 | 8/2004 | Sami et al. |
| 2004/0186850 A1 | 9/2004 | Chowdhury et al. |
| 2004/0187034 A1 | 9/2004 | Tamura et al. |
| 2004/0255151 A1 | 12/2004 | Mei et al. |
| 2005/0047355 A1 | 3/2005 | Wood et al. |
| 2005/0060412 A1 | 3/2005 | Chebolu et al. |
| 2005/0076222 A1 | 4/2005 | Olkin et al. |
| 2005/0144279 A1 | 6/2005 | Wexelblat |
| 2005/0144284 A1 | 6/2005 | Ludwig et al. |
| 2005/0172229 A1 | 8/2005 | Reno et al. |
| 2005/0226059 A1 | 10/2005 | Kavuri et al. |
| 2005/0228899 A1 | 10/2005 | Wendkos et al. |
| 2006/0021031 A1 | 1/2006 | Leahy et al. |
| 2006/0031412 A1 | 2/2006 | Adams et al. |
| 2006/0059092 A1 | 3/2006 | Burshan et al. |
| 2006/0059136 A1 | 3/2006 | Wooldridge et al. |
| 2006/0059238 A1 | 3/2006 | Slater et al. |
| 2006/0059337 A1 | 3/2006 | Poyhonen et al. |
| 2006/0069697 A1 | 3/2006 | Shraim et al. |
| 2006/0069782 A1 | 3/2006 | Manning et al. |
| 2006/0076404 A1 | 4/2006 | Frerking |
| 2006/0123464 A1 | 6/2006 | Goodman et al. |
| 2006/0123478 A1 | 6/2006 | Rehfuss et al. |
| 2006/0146816 A1 | 7/2006 | Jain |
| 2006/0168022 A1 | 7/2006 | Levin et al. |
| 2006/0190993 A1 | 8/2006 | Noble |
| 2006/0203807 A1 | 9/2006 | Kouretas et al. |
| 2006/0212931 A1 | 9/2006 | Shull et al. |
| 2006/0224742 A1 | 10/2006 | Shahbazi |
| 2006/0230039 A1 | 10/2006 | Shull et al. |
| 2006/0230272 A1 | 10/2006 | Lawrence et al. |
| 2006/0230452 A1 | 10/2006 | Field |
| 2006/0253903 A1 | 11/2006 | Krumel |
| 2007/0006305 A1 | 1/2007 | Florencio et al. |
| 2007/0022479 A1 | 1/2007 | Sikdar et al. |
| 2007/0050377 A1 | 3/2007 | Srivastava et al. |
| 2007/0083670 A1 | 4/2007 | Kelley et al. |
| 2007/0268837 A1 | 11/2007 | Melton et al. |
| 2008/0071953 A1 | 3/2008 | Kershaw et al. |
| 2008/0077995 A1 | 3/2008 | Curnyn |
| 2008/0104186 A1 | 5/2008 | Wieneke et al. |
| 2008/0147837 A1 | 6/2008 | Klein et al. |
| 2008/0172382 A1 | 7/2008 | Prettejohn |
| 2008/0256242 A1 | 10/2008 | Liebman |
| 2008/0271118 A1 | 10/2008 | Greenlaw |
| 2009/0043765 A1 | 2/2009 | Pugh |
| 2009/0077616 A1 | 3/2009 | Lindholm et al. |
| 2009/0185523 A1 | 7/2009 | Allen et al. |
| 2009/0214028 A1* | 8/2009 | Schneider ............ H04L 9/3242 |
| | | 380/44 |
| 2009/0271625 A1 | 10/2009 | Kolluru et al. |
| 2009/0287844 A1 | 11/2009 | Bailey |
| 2009/0300759 A1 | 12/2009 | Wang et al. |
| 2009/0311963 A1 | 12/2009 | Haverty |
| 2010/0050255 A1 | 2/2010 | Upadhyay et al. |
| 2010/0131756 A1 | 5/2010 | Schneider |
| 2010/0132018 A1 | 5/2010 | Takala et al. |
| 2010/0241836 A1 | 9/2010 | Proudler |
| 2010/0325424 A1 | 12/2010 | Etchegoyen |
| 2011/0113249 A1 | 5/2011 | Gelbard et al. |
| 2011/0113476 A1 | 5/2011 | Moutarazak |
| 2012/0077480 A1 | 3/2012 | DeLuca |
| 2012/0084549 A1 | 4/2012 | Mackintosh et al. |
| 2012/0158541 A1 | 6/2012 | Ganti et al. |
| 2013/0013905 A1 | 1/2013 | Held et al. |
| 2013/0055256 A1 | 2/2013 | Banga et al. |
| 2013/0198065 A1 | 8/2013 | McPherson et al. |
| 2013/0252604 A1 | 9/2013 | Huber et al. |
| 2013/0287208 A1 | 10/2013 | Chong et al. |
| 2013/0301833 A1 | 11/2013 | Wong |
| 2013/0318573 A1 | 11/2013 | Reunamaki et al. |
| 2013/0333038 A1 | 12/2013 | Chien |
| 2013/0346628 A1 | 12/2013 | Canion et al. |
| 2013/0347111 A1 | 12/2013 | Karta et al. |
| 2014/0006579 A1 | 1/2014 | Pitsch et al. |
| 2014/0123276 A1 | 5/2014 | Bush et al. |
| 2014/0157355 A1 | 6/2014 | Clancy, III et al. |
| 2014/0189808 A1 | 7/2014 | Mahaffey et al. |

(56) References Cited

U.S. PATENT DOCUMENTS

| | | | |
|---|---|---|---|
| 2014/0244991 A1 | 8/2014 | Akdemir et al. |
| 2014/0258465 A1 | 9/2014 | Li |
| 2014/0313975 A1 | 10/2014 | Berenberg et al. |
| 2014/0325588 A1 | 10/2014 | Jalan et al. |
| 2015/0020214 A1 | 1/2015 | Copsey |
| 2015/0026784 A1 | 1/2015 | Kurkure |
| 2015/0058628 A1 | 2/2015 | Abzarian et al. |
| 2015/0067838 A1 | 3/2015 | Gunti et al. |
| 2015/0082438 A1 | 3/2015 | Prieto Alvarez et al. |
| 2015/0089621 A1 | 3/2015 | Khalid et al. |
| 2015/0089625 A1 | 3/2015 | Swanson et al. |
| 2015/0143506 A1 | 5/2015 | Sugano |
| 2015/0180841 A1* | 6/2015 | Heffner ................ H04L 9/0872 380/260 |
| 2015/0180875 A1 | 6/2015 | Kay |
| 2015/0180884 A1 | 6/2015 | Bhargava et al. |
| 2015/0188714 A1 | 7/2015 | Leoutsarakos et al. |
| 2015/0213131 A1 | 7/2015 | Styler et al. |
| 2015/0229609 A1 | 8/2015 | Chien |
| 2015/0256546 A1 | 9/2015 | Zhu et al. |
| 2015/0372978 A1 | 12/2015 | Bharrat et al. |
| 2016/0021610 A1 | 1/2016 | Wan et al. |
| 2016/0099963 A1 | 4/2016 | Mahaffey et al. |
| 2016/0142393 A1 | 5/2016 | Wang et al. |
| 2016/0180094 A1 | 6/2016 | Dasar et al. |
| 2016/0248795 A1 | 8/2016 | Chien |
| 2016/0261601 A1 | 9/2016 | Zhou et al. |
| 2017/0011219 A1 | 1/2017 | Li et al. |
| 2017/0034193 A1 | 2/2017 | Schulman et al. |
| 2017/0118210 A1 | 4/2017 | Athias |
| 2017/0185790 A1 | 6/2017 | Gauda |
| 2017/0332307 A1 | 11/2017 | Pan |
| 2017/0334522 A1 | 11/2017 | Zahid et al. |
| 2017/0364685 A1 | 12/2017 | Shah et al. |
| 2018/0020002 A1 | 1/2018 | Duca et al. |
| 2018/0097843 A1 | 4/2018 | Bursell et al. |
| 2018/0131719 A1 | 5/2018 | Amit et al. |
| 2018/0145986 A1 | 5/2018 | Chien |
| 2018/0189478 A1 | 7/2018 | Richardson et al. |
| 2018/0191510 A1 | 7/2018 | Batten |
| 2019/0037406 A1 | 1/2019 | Wash |
| 2019/0089533 A1 | 3/2019 | Agnello |
| 2019/0190723 A1 | 6/2019 | Lee et al. |
| 2019/0205554 A1 | 7/2019 | Kleinpeter et al. |
| 2019/0312872 A1 | 10/2019 | Hydell et al. |

FOREIGN PATENT DOCUMENTS

| | | |
|---|---|---|
| JP | 2015-503789 | 2/2015 |
| JP | 2016-532381 | 10/2016 |
| JP | 2018-124893 | 8/2018 |
| WO | 2005/020446 | 3/2005 |
| WO | 2008/054375 | 5/2008 |
| WO | 2013/006296 | 1/2013 |
| WO | 2016/176686 | 11/2016 |
| WO | 2016/178816 | 11/2016 |
| WO | 2017/035159 | 3/2017 |
| WO | 2017/112641 | 6/2017 |
| WO | 2018/063583 | 4/2018 |

OTHER PUBLICATIONS

Meng, Ge, and Jiao Yanli, "Research on E-Intelligence Maintenance System for Manufacturing Industrials," in 2011 International Conference on Internet Computing and Information Services, pp. 457-458, IEEE, 2011.

Extended European Search Report dated Jul. 11, 2016, in European Patent Application No. 14 83 6161, 7 pages.

Horowitz, Michael, "Examples of Links That Lie," michaelhorowitz.com, last updated Jan. 29, 2008, retrieved from the Internet at http://www.michaelhorowitz.com/linksthatlie.html, on Feb. 8, 2008, 11 pages.

International Search Report and Written Opinion of the International Searching Authority dated Aug. 29, 2019, in International Patent Application No. PCT/US19/23274, 7 pages.

International Search Report and Written Opinion of the International Searching Authority dated Oct. 18, 2018, in International Patent Application No. PCT/US18/29486, 8 pages.

International Search Report and Written Opinion of the International Searching Authority dated Aug. 21, 2014, in International Patent Application No. PCT/US14/31244, 6 pages.

International Search Report and Written Opinion of the International Searching Authority dated Jul. 25, 2019, in International Patent Application No. PCT/US19/34039, 7 pages.

International Search Report and Written Opinion of the International Searching Authority dated Oct. 12, 2007, in International Patent Application No. PCT/US06/35159, 6 pages.

Interntional Search Report and Written Opinion of the International Searching Authority dated Jan. 31, 2018, in International Patent Application No. PCT/US17/60889, 6 pages.

International Search Report and Written Opinion of the International Searching Authority dated Feb. 21, 2018, in International Patent Application No. PCT/US17/61886, 6 pages.

International Search Report and Written Opinion of the International Searching Authority dated Apr. 23, 2018, in International Patent Application No. PCT/US07/64102, 8 pages.

"Netcraft Toolbar Tutorial," Netcraft Ltd, 2007, retrieved from the Internet at http://news.netcraft.com/archives/2004/12/29/netcraft_toolbar_tutorial.html, on Feb. 8, 2008, 4 pages.

Office Action dated Mar. 20, 2009, in U.S. Appl. No. 11/470,581, 7 pages.

Extended European Search Report dated Jul. 15, 2022, in European Patent Application No. 19897426.3. 10 pages.

Extended European Search Report dated May 10, 2022, in European Patent Application No. 19867056.4, 7 pages.

\* cited by examiner

TIMESTAMP-BASED SHARED KEY GENERATION

TECHNICAL FIELD

The present disclosure relates to methods, techniques, and systems for computer security, and more particularly to timestamp-based approaches to shared key generation for encryption and decryption, without any pre-defined shared key, public-private key pair, certificate with a private key, or exchange or verification of generated keys.

BACKGROUND

Encryption techniques divide into symmetric cryptography and asymmetric cryptography. Symmetric cryptography involves the use of a shared key (a shared secret) used to convert data to and from an unreadable form known as encrypted data or ciphertext. That is, the identical key is used for encryption and decryption. Symmetric encryption techniques suffer from a need to first exchange the shared key, which in itself is vulnerable to security breaches. Another disadvantage associated with symmetric encryption is that it is not easy to change the key, especially if the exchange is to be performed offline (not via a network).

Many encryption algorithms in use today, such as RSA, use some form of public-private key pairings to share secure data, packets, etc., between computing systems, to sign and subsequently verify digital signatures, and the like. These algorithms are generally known as asymmetric cryptography because the keys used to encrypt the data are different than those used to decrypt the data. These algorithms depend upon use of two keys: a recipient's public key which is publicly known and used by a sender to encrypt information and a secret private key for the recipient which is used to decrypt information encrypted with the public key. A person who has a public key of a specific recipient can encrypt a message intended to be sent to that person. The message can then only be decrypted by the recipient using his/her own private key (always kept a secret).

Public and private key encryption techniques suffer from the fact that the keys are generally long lived and tightly bound to a particular user or entity. It is not always a simple matter to acquire a new key pair. Also, if an entity loses its private key, it will never again be able to decrypt data encrypted with its public key. Furthermore, asymmetric encryption is inherently "one way," in that only the party (usually a single party) with the private key can encrypt the data. This means that multiple key pairs must be used to effect two-way communication. Finally, such techniques may also require infrastructure to create, manage and look up keys. This additional infrastructure may itself be subject to insecurities.

The primary use of these encryption techniques is to protect data during its transmission from one computing system (device, environment, etc.) to another and/or to digitally "sign" data so that a recipient can verify that the source of the data is from the source it claims. Using symmetric or asymmetric encryption, the transmitted information is converted to an unreadable format. Hypothetically, this prevents, for example, hackers and other malicious parties from illegitimately gaining access to the transmitted encrypted data (ciphertext).

However, an encryption system is only as secure as is the security afforded by its key(s). Security of keys can be increased by the number of bits used to generate the key. For example, an encryption system that uses a 2048-bit key is more computationally difficult to break using brute force (trial and error of all combinations) techniques as compared to a system that uses a 1024-bit key. Thus, hackers and other malicious parties attempt instead to expose flaws in the underlying algorithms used to generate the keys rather than trying to decrypt encrypted data using brute force techniques (trying all possible keys).

To keep transmitted information more secure, some implementations of public-key encryption (such as SSL and TLS) make use of certificate and certificate authorities to ensure that communications (for example a page provided by a server) can be verified as associated with a currently valid certificate associated with a server which has been previously verified by the certificate authority. After verification, these systems will generate a shared session key and then may use whatever cryptographic technique is desired to encrypt data transmitted between systems.

In addition, some systems use a combination of asymmetric and symmetric encryption. For example, public key encryption techniques may be used to send a shared session key (the shared secret) that is encrypted using the public key of the recipient. For example, in exemplary "hybrid" systems, a public key of an intended recipient may be used to encrypt a new shared key generated by the sender. The generated shared key can then be retrieved (decrypted) by the recipient (using the recipient's private key) and used for symmetric encryption data transmission, in which the encryption and decryption keys and algorithms are the same on both sides of the transmission. Often the shared (symmetric) key is session based and destroyed after the session ends.

DETAILED DESCRIPTION

Figure 1:
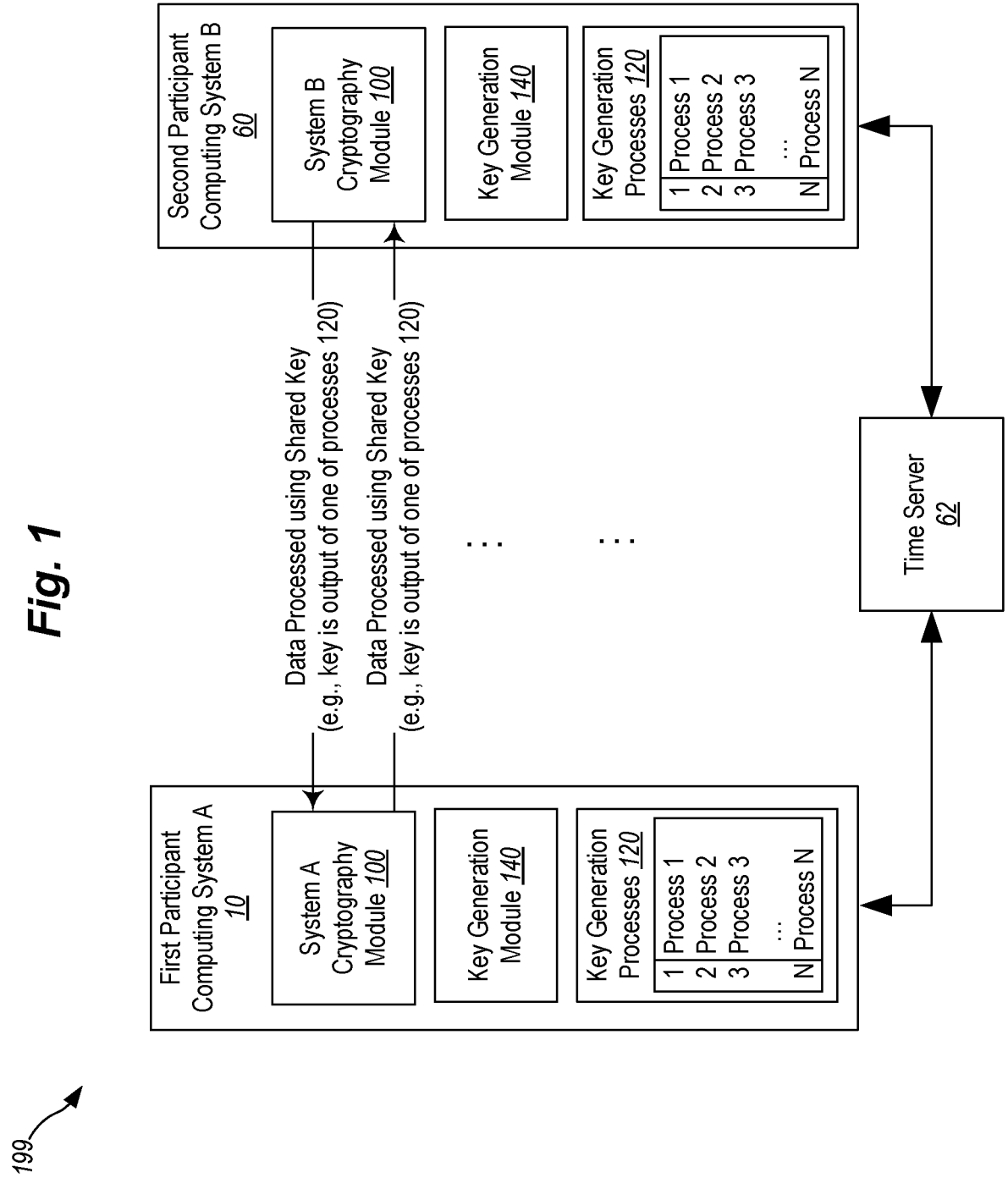
FIG. 1 is a block diagram that illustrates an environment for practicing an example embodiment of the shared key generation technique described herein.

Embodiments described herein provide methods, devices, and systems for computer security, and more particularly timestamp-based key generation techniques to be used for encryption and other data processing without dependence on a predefined shared key on the device, shared key exchanges, public/private key generation or certificate. Using the described techniques, there is no need to ever exchange or persistently store a shared key.

The described techniques address many of the shortcomings of prior art encryption schemes, which is that there is at least one key required to configure the cryptosystem. This key may be a pre-defined or public-private key, or a certificate, which itself includes a public key, while the owner retains the private key. Such systems are therefore vulnerable to hackers or disgruntled employees who may steal the key and thereby compromise system security. Also, certificates are typically long lived, having a lifespan of many years, as it is very hard to distribute a certificate to every participant and coordinate a date to switch to use a new certificate. If the private key associated with a certificate gets stolen, it will have long lasting effect.

The described invention includes a new process for cryptography that does not store any key anywhere on the system. Hackers or disgruntled employee cannot steal a key to compromise security, as in current and prior technologies. The described invention is based on timestamps obtained from a synchronized clock (e.g., synchronize to a time server). These timestamps are manipulated (typically via a random number generator and other mathematical methods) to generate a new shared key for encryption/decryption. Two machines that use synchronized clocks and synchronized manipulation techniques will thus generate the same shared key, which can then be used to secure a communication channel. In typical embodiments, the time server does not use the standard GMT clock. More important, this time server's clock can run at its own speed not defined in the International System of Units. Security can be maintained by one or more of the following features: restricting access to the time server, running the time server at a different speed than (or offset from) standard time, and keeping the timestamp manipulation techniques (e.g., random number generator) secret. Further, this new shared key can be generated as often as one would like. This will make much harder to use brute force method to decrypt the data. In addition, there is no need to exchange a new shared key by using a secure session between computing systems.

Typical embodiments provide a cryptographic method that utilizes a secure key generation process for use with symmetric cryptographic algorithms to encrypt/decrypt data/ciphertext. Portions of the key generation process itself, for example, the method for determining which key generation process to select, are configured to be shared by participating systems such that the entire process results in generating the same shared key on each participating system based upon a synchronized timestamp. Since the timestamps are the same and the selected key generation process is the same for each participant, the generated keys are the same and can thus be used as a "shared" key.

A significant difference in the described techniques versus known techniques that require a key exchange or alternative method, such as public/private key (asymmetric) encryption or certificate-based methods, is that each participating system is responsible for generating its own shared key and no exchange of keys is needed. Moreover, the shared key can be changed often (a new key generated), including at particular times, intervals, or even at each transaction or after some number of uses of the shared key. As long as the timestamps for each participating system are synchronized (the same, within some margin of error), the mechanism for selecting which shared key generation process to use are the same, and the shared keys are computed by each participant at the same time, then the resultant generated keys can operate as shared keys.

In overview, a table of shared key generation processes (methods, algorithms, formulas, equations, etc.) for manipulating a timestamp to generate a shared key is shared (is the same) between participant systems/users. A key generation process selection method that determines which key generation process entry in the table is to be used for a particular (potentially next) transaction is a shared secret between the participating systems. For example, this shared secret may be set up at system initialization time or at some other time by an authorized user/administrator of the participating systems.

Each participating system then separately determines (for its own system) which shared key generation process entry of the table to use to generate a shared key based upon the same key generation process selection method, which generates a number used to index the shared key generation process table. Since the same key generation process selection method is used, and the table of shared key generation processes is the same, the same index number is generated and used by each participant system. Based upon this determined index, a next key generation process entry is retrieved from the table and applied to a timestamp obtained from a local clock (synchronized for each participant and thus the same) to generate a shared key which can then be used with existing or future cryptographic algorithms (or other processing) to encode and decode data transmissions.

Timestamps used are typically of the form described in U.S. application Ser. No. 16/220,652, filed Dec. 14, 2018, entitled "Time-Based Authentication" and U.S. application Ser. No. 16/359,962 filed Mar. 20, 2019, entitled "Time-Based Authentication with Redirection," which applications are both incorporated by reference in their entireties. As described there, these timestamps are synchronized, locally determined for each system and based upon each system's local clock (hardware or software). This local clock is synchronized from a network-accessible time server or other source, such a radio clock signal or the Global Positioning System. For the highest level of security, a private time provider/server can be used to synchronized all participant's clocks. This private time provider does not need to use standard GMT clock. Furthermore, its clock speed (rate) does not need to adhere to the International System of Units so its clock can run faster or slower. In this case, it will be much harder for an attacker to determine the current time or guess the future time on the participant clock. Further, the format and precision of the timestamp used for participating systems may also be configured as a shared secret between them or set up a priori.

An example shared key generation process may apply a function and/or a constant to a timestamp value and, since the number of such methods is practically speaking infinite, an unauthorized party would not have access to the generated shared key without knowledge of the key generation process selection method and the timestamp used to generated the shared key. Accordingly, the described techniques enhance key generation for use with symmetric encryption algorithms without requiring a separate transaction (for example using public key encryption) to exchange a session key or other symmetric key and without requiring certificates or validation of certificates (or any other token) before exchanging symmetric keys or asymmetric public key encryption pairs. Accordingly, all of the benefits of symmetric key encryption such as speed in encryption/decryption processing can be realized without the vulnerabilities inherent in first exchanging a shared key between participating systems before transmitting ciphertext for decryption.

Thus, the described techniques improve an existing technology, such as by improving the operation, integration, or efficiency of one or more computing systems. Specifically, the described techniques address shortcomings in current approaches to computer security. Using the described techniques makes it more difficult for a malicious computing system to intrude into a secure service, system, or network. The described techniques restrict access to only those computers or devices that have been configured with the proper key generation processes.

FIG. 1 is a block diagram that illustrates an environment for practicing an example embodiment of the shared key generation technique described herein. In FIG. 1, a system 199 includes a first participant computing system "A" 10, a second participant computing system "B" 60, and a time server 62. The participant computing system 10 includes a cryptography module 100, a key generation module 140, and a table (or similar collection) of key generation processes 120 used by the key generation module 140 to generate a shared key. The participant computing system 60 also includes a cryptography module 100, a key generation module 140, and a table (or similar collection) of key generation processes 120, which is the same as the selected key generation process 120 of participant system 10 and used by the key generation module 140 to generate a shared key. In some embodiments, the key generation process table 120 may also include other processes or configuration data, such as cypher suites.

By way of overview, the systems 10 and 60 in some embodiments communicate securely as follows. First, participant computing system 60 and participant computing system 10 are deployed for interaction via a secure service or network, such as may be provided by a corporation, university, or other organization. When each participant computing system is initially configured (e.g., when it is unboxed and configured for its user), an administrator or other privileged user stores or otherwise configures each computing system with the illustrated modules, including the key generation process table 120. This may be done manually, such as by loading the modules and data via a thumb drive or other media. In other embodiments, modules and data may be transmitted to each participant computing system over a secure channel, such as a network that is not connected to the outside world.

Second, each system synchronizes its internal clock to a private time server, such as time server 62. The private time server is accessible only by systems 10, 60, and possibly other authorized systems. Access to the private time server can be controlled by various known techniques, such as by virtual private network, physical network restrictions, white lists, or the like. In one embodiment, the private time server includes a white list of authorized computing systems, where the white list contains machine identifiers, such as IP addresses, hardware identifiers, or the like. The private time server need not (and typically will not) follow standard clock time. For example, the private time server may run 23 minutes behind standard time. In addition, the time maintained by the private time server may flow faster or slower than standard time. For example, time may flow 10% faster on the private time server, such that for every minute of real time that elapses, the clock on the private time server advances by 66 seconds. If the system fails to synchronize itself with the time server, it in some embodiments enters a self-protection mode in which it takes measures to protect information on or access to the system, such as by locking out users, transmitting distress messages, encrypting or erasing data, or the like.

Once the participant computing systems have synchronized their clocks with the private time server, they generate a first shared key as follows. First, a timestamp is obtained from the system clock (synchronized to private time server). This timestamp is used as a seed for a random number generator, which was also provided to the system upon initial configuration. The output of the random number generator is used to generate an index into the table of key generation processes 120. The selected key generation process 120 is then used by the key generation module 140 to generate an encryption key.

Since systems 10 and 60 are both synchronized to the same private time server, and both use the same random number generator, the systems 10 and 60 will during operation select the same key generation process (and thus generate the same key) so long as both systems use timestamps that are equal within some precision interval (e.g., minute, hour, day). To guarantee that systems use the same timestamps, each system is also configured with a key generation schedule that informs that system when it should generate a new key. In an example embodiment, the schedule indicates that a new key should be generated every hour. For example, at 7:00 AM, each system obtains and uses a timestamp to select a key generation process. Each system uses the timestamp (or portion thereof) as the seed to the random number generator to create the index into the key generation process table 120. The selected key generation process is used to generate a key. Then, supposing system 10 starts communicating at 7:15, system 10 will use the key generated at 7:00 AM to encrypt data transmitted to system 60. Since system 60 will have performed the same process, it will have generated the same key, and thus be able to decrypt data received from system 10.

In an alternative approach, the key is not generated until communication begins. Thus, for example, if system 10 begins communicating at 7:23 AM, the system obtains a timestamp, takes the hour floor (7:00 AM) of the timestamp, and then uses that value as the seed to the random number generator to create the index into the key generation process table 120. The selected process is used to generate a key to encrypt data transmitted to system 60. System 60 will perform the same process, using 7:00 AM as the truncated timestamp to retrieve the same key generation process as was used by system 10, thereby generating the same key, which can in turn be used to decrypt the received encrypted data.

In typical embodiments, key generation processes 120 take as input a timestamp and output a number based on the timestamp. This number is the shared key generated. An example process may be expressed as K=a*timestamp+b, where a and b are constants stored as part of the key generation process table 120. In some embodiments, the constants a and b are fixed or static parts of the process, whereas in other implementations, the constants are configuration data that is specified when the key generation process is selected or stored. Other embodiments may use other or additional operators (e.g., subtraction, exponentiation, modulo, etc.) to compute the output based on the timestamp. In some embodiments, the constants a and b are themselves determined based on output of a random number generator, seeded with a timestamp, a previously stored value, or some combination thereof. This makes the specifics of the key generation process even more difficult to guess by an attacker.

In some embodiments, each participant computing system such as participant computing system 10 and participant computing system 60 generates a shared key as follows. First, the participant computing system obtains a timestamp reflecting the current time from a hardware or software clock. The clock is typically local to the participant system but may in some embodiments be a network-accessible time server or be synchronized to a private network time server as described above. The participant computing system then applies a selected key generation process 120 to the timestamp to obtain a number, which is to be used as a shared key. For example, if the timestamp is 1544512669, and if the process 120 applies the function K=34*timestamp+54543, the resulting value would be 52513485289. This is then the shared key shared because another participating computing system determines the same key (independently) using the same process for selecting a key generation process, the same selected key generation process 120, and the same timestamp. The shared key can then be used to process and transmit secure (e.g., encrypted) data between the participating computing systems.

Each participant computing system may also perform steps to assure the generation of a key of a given size. For example, if 2048-bit keys are used, the system may manipulate the timestamp (or portions thereof) to produce a 2048-bit data value, which is then processed by the key generation process. As a simple example, the system may repeat a 64-bit timestamp 32 times to produce a 2048-bit value, which is then processed according to the key generation process. The timestamp may of course be cut up, repeated, reversed, XOR'd, or otherwise manipulated in various ways as it fills the 2048-bit base value. In some embodiments, the exact process for converting a timestamp into a base value is specified by the key generation process itself, such that each key generation process uniquely transforms the timestamp into a 2048-bit value, and then uniquely operates on that value (e.g., by multiplication, addition, subtraction) to produce the shared key.

In typical embodiments, all participant computing systems use the same processes to select key generation processes, such that all participants use the same key during given time intervals. In some embodiments, since a particular computing system may "participate" in secure transactions with multiple other computing systems (a participant group) like broadcasting an encrypted message, the particular computing system stores and associates a key generation process selection method separately associated with each other participant in the group. Thus, when the particular computing system is directed to generate a shared key for one or more transactions with another particular computing system, it must first select a key generation process 120 specific to that participant group before generating a shared key to use for those transactions. A participant group may comprise one or more participant computing systems, even greater than two if a shared key is to be accessible to all of them. Each computing system will typically have a table (list, file, database, or otherwise) that maps other participants to their respective process selection methods, so that different key generation processes can be employed for each participant group.

In some embodiments, this table maps a non-modifiable device/user identifier of the participant (e.g., MAC address, CPU identifier, or some combination thereof) to an identifier of the process selection method. Each participant computing system in a group of participant computing systems receives the device identifier as part of the initialization data, via a separate network transmission, or otherwise as part of an initial network handshake or other network protocol related operation.

Participant computing systems such as system 10 and 60 may decide to generate a shared key for use in one or more data processing transaction at different times. If both systems follow the same processes as described here (using synchronized clocks), they will naturally generate matching keys, and there will be no need for key verification or regeneration. For example, if a schedule indicates that new keys are to be generated every hour, one system may generate a key later than another because one system was powered up later in the hour. If both systems are configured to use a timestamp truncated to the hour (dropping minutes, seconds, etc.), they will both select and use the same key generation process, even though one system does so later than the other. In some embodiments, an optional test data processing transaction (such as a test encryption/decryption sequence) may be exchanged by the participant systems to determine whether each has the same generated key. If not, the process of shared key generation may be repeated until a usable shared key is generated.

As a general matter, the time server used by participating systems can assure that clocks are synchronized to a very high degree of precision (e.g., millisecond or better). Nonetheless, in some embodiments, the key generation process 120 used by each of the participating systems may reduce the precision of the time stamp to a larger time interval. The same reduction in precision may need to be performed during initial system setup. Thus, this reduction may be predefined during initial setup between the participant systems. For example, if the timestamp is expressed in seconds, the key generation process 120 may round, floor, or ceiling the timestamp to the nearest 10-second interval (e.g., by dropping the ones digit). Also, to account for timestamps that transition across the boundaries of a time interval, the system 10 may apply the key generation process 120 to timestamps reflecting the current as well as the previous time interval. As an example, suppose the timestamp obtained by the first participant computing system 10 is 1239, and that the key generation process drops the ones digit before applying its function. Using K=34*modified timestamp+42 yields 34*123+42=4224. If the timestamp obtained by the second participant computing system 60 is one second later (1240), the computing system 60 will generate K=34*124+42=4258, which does not match the shared key of computing system 10. But if the computing system 60 also tries to compute the shared key using the lower precision timestamp (drop one digit, 123), it will obtain a number (34*123+42=4224) that matches the shared key of computing system 10. In other embodiments, multiple shared keys are computed using the current timestamp, a timestamp based upon the prior interval, and/or a timestamp based upon the next future time interval. If then any computed keys succeed in processing the test data, then the computing system has a working shared key. If not, other steps may be taken to first synchronize the clocks of the participating systems. Other modifications are similarly possible.

Each system may select a new key generation process from time to time or upon the occurrence of an event. By changing the key generation process, it becomes more difficult for a malicious party to recover the number-generating function at the heart of the described techniques. For example, a participant computing system 60 may select a new key generation process selection method after every n-th transaction, after a passage of time (e.g., 1 minute, 1 hour, 24 hours), at a fixed date (e.g., Jan. 1, 2020), or the like. In some embodiments, each system stores a table or similar data structure that represents multiple refresh intervals. Each time a key generation process is selected, a new refresh interval is also selected from the table. The refresh interval may be selected in a manner similar to the key generation process, such as by way of a random number generated based on a timestamp.

Similarly, new shared keys may be generated between participant computing systems from time to time or upon the occurrence of an event. For example, a participant computing system 60 may generate (using a previously selected key generation process) a new shared key after every n-th transaction, after a passage of time (e.g., 24 hours), at a fixed date (e.g., Jan. 1, 2020), or the like. By changing shared keys, it becomes more difficult for a malicious party to recover the number-generating function at the heart of the described techniques.

In some embodiments, the details of the different key generation processes 120 may be public. In such embodiments, the table 120 will typically host many (e.g., millions) of key generation processes, so that a malicious party cannot try them all by brute force. Secrecy can be maintained in such "semi-public" embodiments by one or more of (1) using a private time server, (2) keeping the process selection method (e.g., the random number generator used to select a process) a secret, (3) keeping the key generation schedule secret, or the like. Also, or alternatively, each key generation process 120 may utilize configurable constants or other inputs that can also be kept as secret between the participant groups. In some embodiments, the key generation processes are themselves private. For maximum security, the key generation processes are only shared between machines and systems within an organization. For example, a corporation can establish a secret set of key generation processes that is used only for purposes of exchanging encrypted data between employee devices. This set may be stored in a secure shared repository or loaded directly onto each device.

In some embodiments, the described techniques are employed to generate shared keys for users and their devices in the context of a corporate or organizational network. In other contexts, the techniques can be employed in the context of an online Web-based service. First, the client machine must be synchronized with a public time server so the Web server can have the same clock as the client machine. In such embodiments, each time a user signs up for a Web service, the server may need to create a new table of key generation processes for this user and share it. Then the service initiates generation on the server and on the client device of a new shared key. The user's client device maintains a table that maps Web services to key generation process selection methods, so that the correct selection method can be employed to select a shared key generation process based on the Web service the user is accessing. Further, as noted above, these techniques can be combined with others that use device identifiers (e.g., MAC or CPU identifiers) to verify the identity of devices when accessing secure systems. Such techniques are described in U.S. Patent Application Pub. No. 2018/0146001, entitled "Network Security based on Device Identifiers and Network Addresses," filed Nov. 22, 2016, which is incorporated herein by reference in its entirety.

Note that while timestamps are herein sometimes described as integer numbers, they may be represented differently in other embodiments. For example, some embodiments may represent a timestamp as having component parts or fields that refer to logical time and date elements. Thus, rather than using only a single large (e.g., 64-bit) number that represents the number of seconds or milliseconds since some shared starting point (epoch), the timestamp may also or instead include fields that represent year, month, day, hour, second, and microsecond. Such a timestamp may represent the date and time Apr. 23, 2020, 5:32.19 PM as 20200423173219, where the digits in sequence represent year, month, day, hour, minute, and second. Such a record-based timestamp may be combined with an epoch-based timestamp, such as 202004231732191587627139, where 1587627139 represents the number of seconds since Jan. 1, 1970 ("Unix time").

Note that there is effectively no limit to the number of different key generation processes that may be created and/or used. Some embodiments provide a multitude (e.g., millions) of different key generation processes, of which different subsets may be employed by different corporations, organizations, or the like. This allows each organization flexibility and uniqueness with respect to other organizations. Each organization can thus implement its own policies for selecting, replacing, and updating key generation processes.

Note that the described shared key generation techniques can be performed without user interaction. In particular, the key generation module can automatically and without user intervention apply the appropriate key generation process, use the resulting number (possibly along with other, cached login credentials or tokens) to securely encrypt/decrypt or otherwise process data, and so on. In this way, the techniques may be completely transparent to the user. Furthermore, the techniques may be implemented at different levels of the protocol stack in different embodiments. For example, one embodiment may perform the key generation in response to transactions at the application layer, such as via an HTTP connection. Another embodiment may perform the key generation at a lower layer, such as layer 2 (data link) or 3 (network).

Note that although key generation processes are herein typically described as taking a timestamp as an input, other types of key generation processes are also contemplated. For example, some key generation processes may take just a portion of a timestamp as an input. Other processes may take as input some number that is based on a timestamp, such as the index of the key generation process in the table of processes. Combinations of inputs are also contemplated, including a timestamp combined with a network identifier or portion thereof.

Figure 2A:
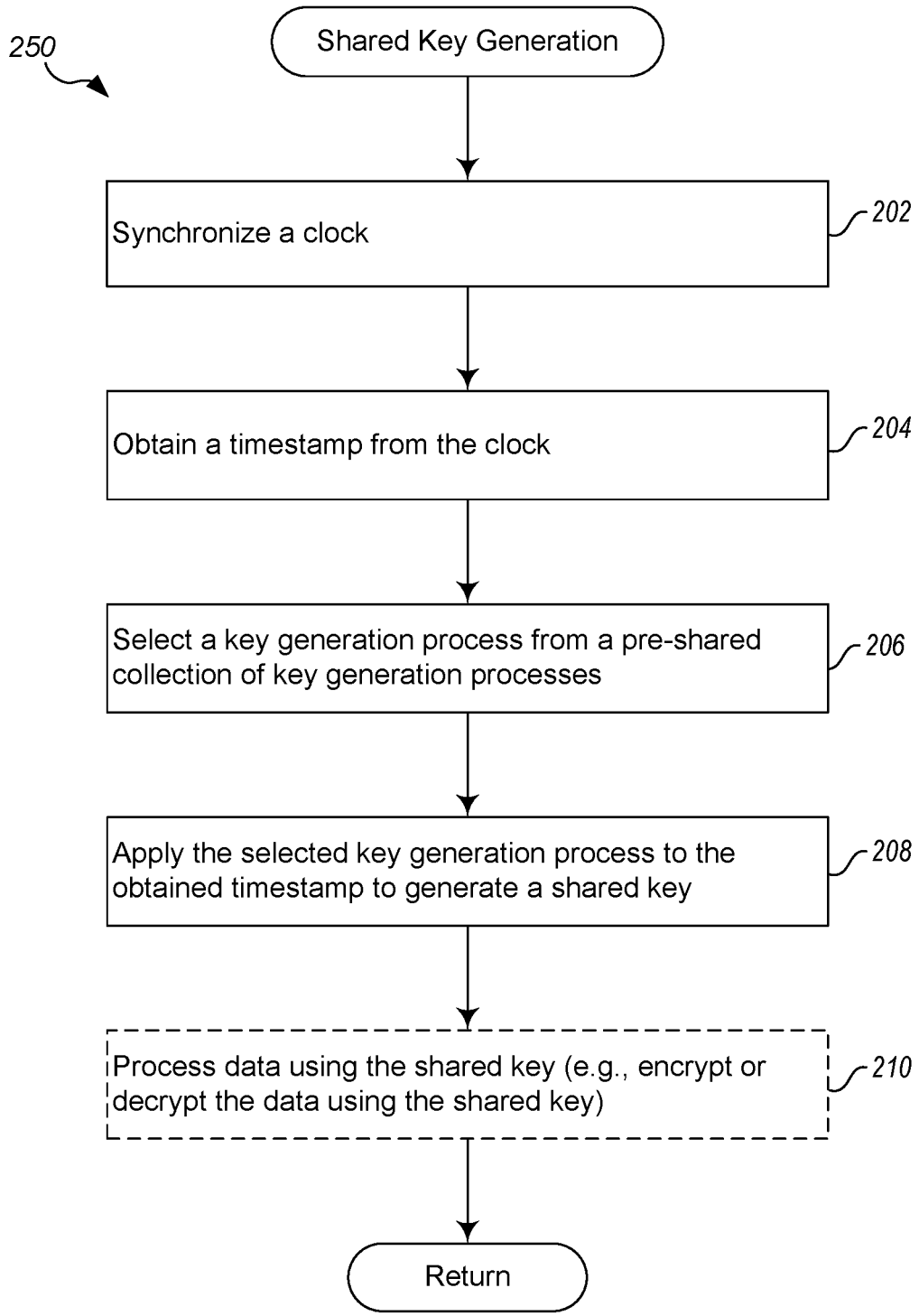
FIGS. 2A and 2B are flow diagrams that illustrate processes in example participant computing systems for generating shared keys according to example embodiments.
Figure 2B:
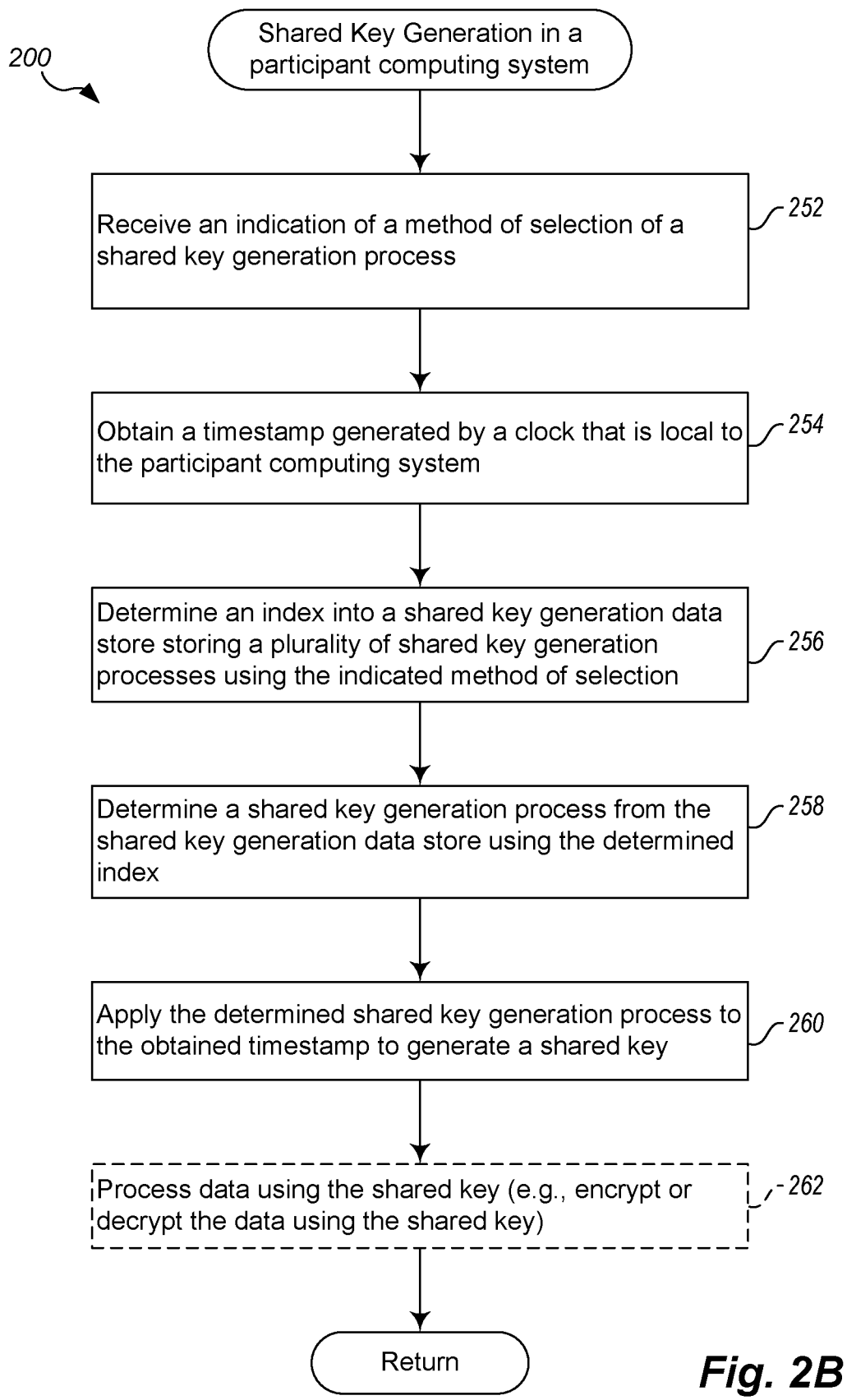

FIGS. 2A and 2B are flow diagrams that illustrate processes in example participant computing systems for generating shared keys according to example embodiments. FIG. 2A is a flow diagram that illustrates a first process in an example participant computing system for generating a shared key according to example embodiments. The illustrated logic in this flow diagram may be performed by, for example, the key generation module 140 described with respect to FIG. 1, above.

In block 202, the process synchronizes a clock in a participant computing system. As discussed above, a clock may be synchronized by accessing a network time server, the GPS system, or by other known processes. To preferentially provide a higher level of security, the process synchronizes its clock with a private time server, accessible only by devices and systems operated by a given organization (e.g., corporation, school, etc.). The time kept by the private time server also may not track real time, in that it may run faster/slower than real time, or be offset from real time by some amount.

In block 204, the process obtains a timestamp from the clock. Typically, the process will make the appropriate operating system call to access the system time. Instead of using a synchronized local clock, some embodiments may instead obtain a timestamp directly from a shared clock, such as the above-described network time server.

In block 206, the process selects a key generation process from a pre-shared collection of key generation processes. As discussed herein, each participant system may be provided with a table, list, or other collection of key generation processes. In typical embodiments, the process uses the timestamp to select the key generation process from a table of key generation processes. For example, if the table has N entries, the process may use index=timestamp modulo N to index the table. As another example, the process may use a random number generator that is seeded with the timestamp to generate a random number that is used to index the table (e.g., index=random(timestamp) module N, where N is the number entries in the table). Other embodiments may select the key generation process based on other or additional information, such as an identifier of the recipient machine (taken alone or in combination with the timestamp).

In block 208, the process applies (e.g., runs, executes) the selected key generation process to the obtained timestamp. In other embodiments, the process uses a second timestamp that differs from the one used to select the key generation process. The second timestamp may obtained upon the onset of communication with a remote system, whereas the initial timestamp (used to select the key generation process) may have been obtained some time earlier. As discussed above, a key generation process is typically a function that takes a timestamp as input and produces an output that can be used as an encryption key. The key generation process may specify one or more mathematical operators and constants that are to be applied to the input key. As one example, a key generation process may be expressed as a function $f(\text{timestamp})=A*\text{timestamp}^B+C$, where A, B, and C are constants, such as 123, 23, and 34223. In order to generate keys having a sufficient number of bits some embodiments may repeat all or some of the timestamp (or the key generated from the timestamp) to fill out the necessary number of bits. The manner in which the timestamp is repeated and/or otherwise manipulated may itself be specified by the key generation process. For example, one key generation process may specify that a 64-bit timestamp is duplicated 32 times to generate a 2048 bit value. Other operations may be performed during this padding process, such as using only a portion of the available bits, reversing bits, shifting bits, or the like.

In block 210, the process optionally process data using the generated key. For example, the process may use the key to encrypt the data, and then transmit the encrypted data to a remote receiver computing system. Because that receiver computing system used this same described process to select a key generation process and generate a key, the receiver computing system will have generated the same key. The receiver can then use this key to decrypt the received encrypted data. Note that the two systems never transmit information about key generation or the key itself. This feature, combined with periodic key changes, makes it very difficult for a hacker or other malicious party to decrypt the encrypted communication.

In some embodiments, each participant is provided with a fixed set of data/code that is used to implement the described functionality. The data/code may include (1) an array or table of key generation processes (or parameters to use in a process); (2) a random number generator (or parameters therefor); (3) a timestamp format that specifies the size and arrangement of fields (if any) within the timestamp and take into the consideration of timestamp precision; (4) key size and a specification of how to manipulate (e.g., repeat, duplicate, reverse) the timestamp or the output of the key generation process to fill out the key size; (5) data that specifies when or how often new keys are to be generated.

FIG. 2B is a flow diagram that illustrates a second example process for generating a shared key according to example embodiments. The illustrated logic in this flow diagram may be performed by, for example, the key generation module 140 described with respect to FIG. 1, above.

In block 252, the participant computing system receives an indication of a method of selection of a shared key generation process. The output of this method is an index into a table (data store) of key generation processes. Typically, each participating computing system in a group is assigned (the same) key generation process selection method during initial setup, such as when the client computing system is deployed within an organization that is using the described security mechanism. The key generation process selection method is a function, code block, or similar logic that provides a numerical result as output.

In some instances, the index to the key generation method table is computed by the shared method selection formula using a pseudo random number. The seed for this pseudo random number may be based upon each participating system's timestamp (e.g., a 64-bit integer taking into consideration precision, such as nearest second, minute, or hour) as a "seed" for random number generation thereby adding another degree of security to the computation.

In block 254, the participant computing system obtains a timestamp generated by a synchronized clock that is local to that computing system, such as by making the appropriate system call to get a timestamp from the system clock. The system clock of each participant computing system are synchronized with a central time server. As discussed above, various time sources may be used to establish exactly or substantially synchronized system clocks, such as network time servers, GPS, radio time signals, or the like. In some embodiments, instead of using the system clock, the participant computing system may obtain a timestamp directly from a network accessible source, such as a network time server.

In block 256, the participant computing system determines an index into the key generation data store 120 by executing the indicated method of selection. The datastore typically includes an indexed table that includes multiple key generation processes. As discussed above, a random number generator may be seeded with the timestamp to determine an index that is used to select a process from the table.

In block 258, based upon the determined index, the participant computing system determines (selects, retrieves, obtains, identifies, etc.) a selected key generation process from the shared key generation data store. The participant computing system can determine the key generation process in various ways. It may look up the key generation process based upon the index or can use the index as a hash into a table, and so forth. In some embodiments, the key generation processes are public. In other embodiments, the set of key generation processes is kept secret by an organization.

In block 260, the participant computing system applies the obtained key generation process to the timestamp obtained in block 204 to generate a new (shared) key. In alternative embodiments, the key generation process is applied to a newly taken time stamp. The produced value acts as a shared key when another participant computing system generates the same exact key using the same logic as performed by this process.

Block 260 includes applying an operator to the timestamp and an integer, wherein the operator and the integer are specified by the determined key generation process. Typical key generation processes will operate on the timestamp and at least one other integer using one or more operators. An example process may be expressed as k equals a*timestamp+b, where k is the output number, and where a and b are constants. The constants may be hard coded into the key generation process. In other embodiments, to provide a wider variety of processes, the constants a and b may be computed by key generation process itself, providing it is duplicatable by other participant computing systems. If not provided by the key generation process itself, these constants may be provided to the key generation module of a participant computing system along with an indication of the key generation process itself. Note that in some embodiments the key generation process may also reduce the precision of the timestamp, such as by rounding or flooring the time to a predetermined time interval (e.g., nearest second, nearest 10-second window, nearest minute). This technique can be used to account for clock drift, communication delays, and/or small differences between the participant computing system clocks.

Optionally, in block 262, the participant computing system processes some data using the shared key. For example, this processing may be sending an encrypted message to be decrypted by a participant computing system using the (its own) generated shared key. In optional embodiments, this processing may be a test transaction to ensure the key generation process has produced a viable shared key.

The logic of this process may be initiated to generate a new key in response to various events/conditions such as upon every login, every n-th login, after a passage of time (e.g., every day, week, etc.), at or after a specified date, based upon a transaction, or the like. In addition, the logic of this process is performed by each participating computing system in a participant group to generate a shared key.

Figure 3:
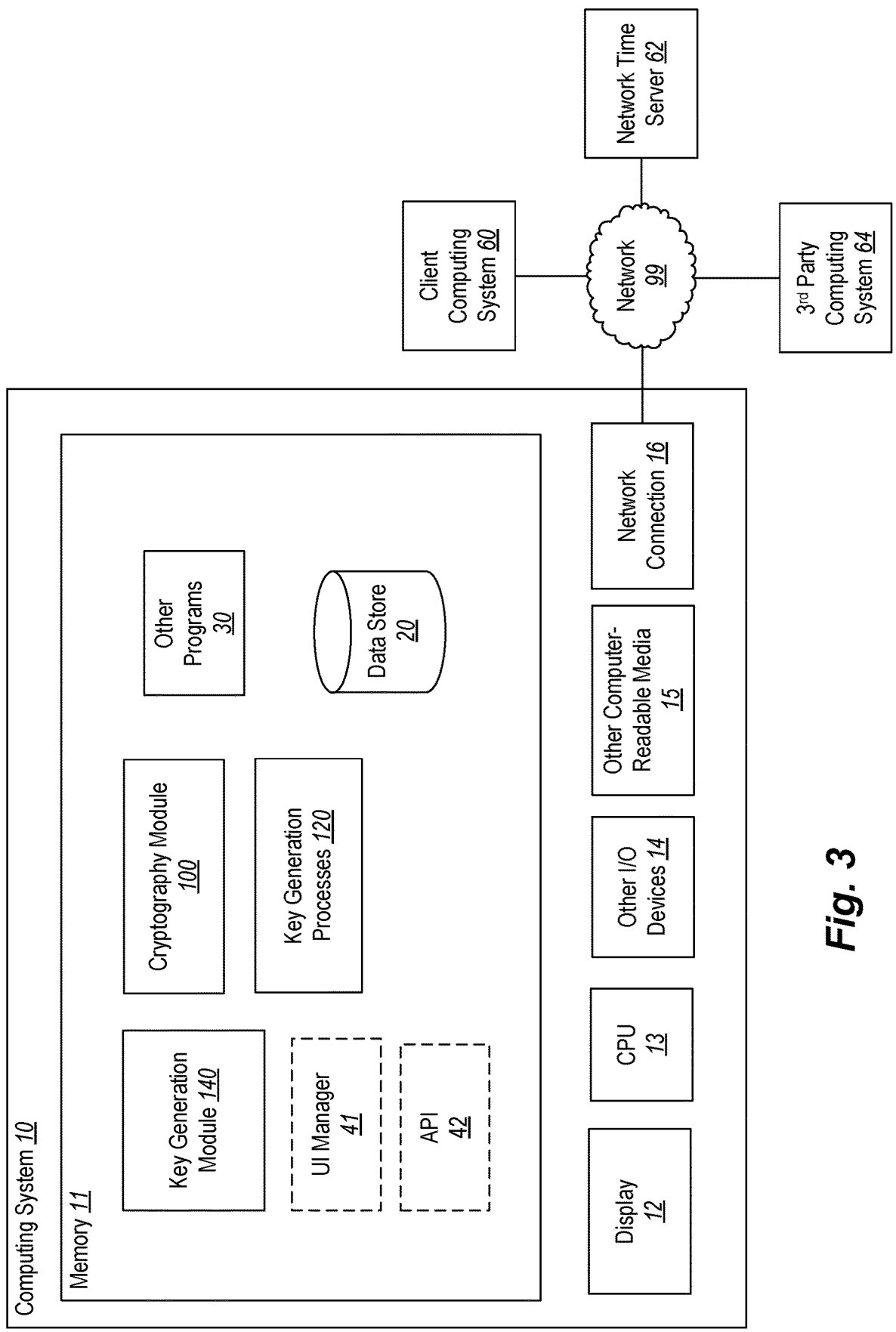
FIG. 3 is a block diagram of a participant computing system for implementing a shared key generation module according to an example embodiment.

FIG. 3 is a block diagram of a participant computing system for implementing a shared key generation module according to an example embodiment. In particular, FIG. 3 shows a computing system 10 that executes the key generation module 140 using a key generation process selected from the key generation processes table 120, and a cryptography module 100 described above. Similar techniques can be applied to implementing other participating computing systems such as computing system 60 described above. Further, the shared key generation module, key generation selection method, and/or selected key generation process may be implemented in software, hardware, firmware, or in some combination to achieve the capabilities described herein.

The computing system 10 may comprise one or more computing systems and may span distributed locations. In addition, each block shown may represent one or more such blocks as appropriate to a specific embodiment or may be combined with other blocks. Moreover, the various blocks may physically reside on one or more machines, which use standard remote procedure call (e.g., RPC) or proprietary inter-process communication mechanisms (IPC) to communicate with each other.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The key generation module 140 is shown residing in memory 11. In other embodiments, some portion of the contents, some or all of the components of the module 140 may be stored on and/or transmitted over the other computer-readable media 15. Other modules may also be present in memory 11, such as the key generation processes 120, and/or a cryptography module 100. The module 140 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 3 may not be present in any specific implementation. For example, some embodiments may not provide other computer readable media 15 or a display 12.

The key generation module 140 is shown executing in the memory 11 of the device 10. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 140.

The UI manager 41 provides a view and a controller that facilitate user interaction with the module 140 and its various components. For example, the UI manager 41 may provide interactive access to the module 140, such that users or administrators can interact with the module 140 such as to configure an initial key generation selection method or a key generation process data store 120 (e.g., if stored locally). In some embodiments, access to the functionality of the UI manager 41 may be provided via a Web server, possibly executing as one of the other programs 30. In such embodiments, a user operating a Web browser executing on a client system or device can interact with the module 100 via the UI manager 41.

The API 42 provides programmatic access to one or more functions of the module 140. For example, the API 42 may provide a programmatic interface to one or more functions of the module 140 that may be invoked by one of the other programs 30 or some other module. In this manner, the API 42 facilitates the development of third-party software, such as user interfaces, plug-ins, adapters (e.g., for integrating functions of the module 100 into Web applications), and the like.

The module 140 may interact using network connection 16 via a network 99 with other devices/systems including computing systems 60, 62, and 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. Computing systems 60, 62, and 64 may be constituted similarly to system 10.

Note that one or more general purpose or special purpose computing systems/devices may be used to implement and/or execute the module 140. However, just because it is possible to implement the module 140 on a general purpose computing system does not mean that the techniques themselves or the operations (taken alone or in combination) required to implement the techniques are conventional or well known. The techniques are not conventional at least because they address and improve an existing technology, such as by improving the operation, integration, or efficiency of one or more computing systems.

In an example embodiment, components/modules of the module 140 are implemented using software programming techniques. For example, the module 140 may be implemented as a "native" executable running on the CPU 13, along with one or more static or dynamic libraries. In other embodiments, the module 140 may be implemented as instructions processed by a virtual machine that executes as one of the other programs 30.

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 140, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Furthermore, in some embodiments, some or all of the components of the module 140 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A secure communication system, comprising:
   a first computing system that includes a processor that is configured to:
   obtain a first timestamp;
   select, based on the first timestamp, a first key generation process from a key generation process data store, wherein each key generation process in the data store takes as input a timestamp and generates as output a number that is based on the input timestamp, the number suitable to operate as a shared key for cryptographic use, wherein the first key generation process specifies an operator and an integer and applies the operator to a timestamp and the integer;
   execute the first key generation process to generate a first key; and
   use the first key to decrypt a message received from a second computing system, wherein the second computing system also executes the first key generation process to generate the first key and uses the first key to encrypt the message, wherein the first and second computing systems engage in encrypted communication without ever communicating an encryption key.

2. The system of claim 1, further comprising a private time server that is configured to:
   restrict access to computing systems that are not the first or second computing systems; and
   operate a clock that runs at a rate that is faster or slower than standard time, wherein the first computing system is configured to obtain the first timestamp based on time kept by the private time server.

3. The system of claim 2, wherein the first computing system is further configured to:
   generate a random number based on a random number generator seeded with the first timestamp or portion thereof;
   generate an index based on the generated random number; and
   use the index to look up the first key generation process in the key generation process data store.

4. The system of claim 2, wherein the first computing system and second computing system each store a table of key generation processes, wherein the table of the first computing system is identical to the table stored by the second computing system.

5. The system of claim 2, wherein the first computing system is configured to, upon occurrence of an event or passage of time, select a second key generation process.

6. The system of claim 2, wherein the first computing system is configured to select a new key generation process every hour or day, by:
   obtaining a new timestamp; and
   selecting, based on the new timestamp, the new generation process from the key generation process data store.

7. The system of claim 2,
   wherein the private time server stores a white list that includes indicators of the first and second computing systems, and wherein the private time server only provides time to computing systems identified in the white list,
   wherein the first computing system includes an internal clock and is further configured to:
   synchronize the internal clock with the private time server; and
   obtain the first timestamp from the internal clock.

8. The system of claim 2, wherein the private time server is configured to communicate only with computing systems that are part of a specified virtual private network.

9. The system of claim 1, wherein the first computing system is further configured to:
   obtain a second timestamp; and
   execute the first key generation process with the second timestamp.

10. A secure communication system, comprising:
a first computing system that includes a processor that is configured to:
obtain a first timestamp;
select, based on the first timestamp, a first key generation process from a key generation process data store, wherein each key generation process in the data store takes as input a timestamp and generates as output a number that is based on the input timestamp, the number suitable to operate as a shared key for cryptographic use;
execute the first key generation process to generate a first key;
use the first key to decrypt a message received from a second computing system, wherein the second computing system also executes the first key generation process to generate the first key and uses the first key to encrypt the message, wherein the first and second computing systems engage in encrypted communication without ever communicating an encryption key;
obtain a second timestamp; and
execute the first key generation process with the second timestamp, wherein the first computing system is configured to apply the first key generation process to a value that results from dropping at least one digit of precision from the second timestamp.

11. The system of claim 1, wherein the first and second computing systems are configured to regenerate a shared key when the first computing system cannot successfully decrypt the message.

12. The system of claim 1, wherein the key generation process data store contains millions of entries.

13. A secure communication system, comprising:
a first computing system that includes a processor that is configured to:
obtain a first timestamp;
select, based on the first timestamp, a first key generation process from a key generation process data store, wherein each key generation process in the data store takes as input a timestamp and generates as output a number that is based on the input timestamp, the number suitable to operate as a shared key for cryptographic use;
execute the first key generation process to generate a first key;
use the first key to decrypt a message received from a second computing system, wherein the second computing system also executes the first key generation process to generate the first key and uses the first key to encrypt the message, wherein the first and second computing systems engage in encrypted communication without ever communicating an encryption key;
obtain a second timestamp; and
execute the first key generation process with the second timestamp, wherein the first key generation process specifies steps for manipulating a timestamp of N bits to generate a value of M bits, where M is greater than N, wherein the manipulating includes duplicating at least a portion of the timestamp.

14. The system of claim 1, wherein the first and second computing systems do not persistently store any encryption keys for encrypting data transmitted between the first and second computing systems, and wherein no shared encryption key is ever communicated between the first and second computing systems.

15. A computer-readable storage medium containing instructions that are configured, when executed, to perform a method comprising:
at a first computing system,
obtaining a first timestamp;
selecting, based on the first timestamp, a first key generation process from a key generation process data store, wherein the each key generation process in the data store takes as input a timestamp and generates as output a number that is based on the input timestamp, the number suitable to operate as a shared key for cryptographic use;
executing the first key generation process to generate a first key; and
using the first key to decrypt a message received from a second computing system, wherein the second computing system also executes the first key generation process to generate the first key and uses the first key to encrypt the message, wherein the first and second computing systems engage in encrypted communication without ever communicating an encryption key;
obtaining a second timestamp, wherein the second timestamp is obtained in response to receipt of the encrypted message from the second computing system; and
executing the first key generation process with the second timestamp.

16. The computer-readable storage medium of claim 15, wherein the method further comprises:
obtaining the first timestamp from a private time server that maintains a clock that runs faster or slower than standard time;
generating an index, based on output of a random number generator that is seeded with the first timestamp; and
retrieving the first key generation process from a table of key generation processes stored in the key generation process data store, wherein the data store is stored locally on the first computing system.

17. A method comprising,
at a first computing system,
obtaining a first timestamp based on a clock maintained by a private time server that restricts access to computing systems other than the first computing system, wherein the clock runs faster or slower than standard time;
selecting, based on the first timestamp, a first key generation process from a key generation process data store, wherein the each key generation process in the data store takes as input a timestamp and generates as output a number that is based on the input timestamp, the number suitable to operate as a shared key for cryptographic use, wherein the first key generation process multiplies the first timestamp by a first integer to obtain a first product value and adds a second integer to the product value to obtain a sum that is used as at least part of the first key;
executing the first key generation process to generate a first key; and
using the first key to decrypt a message received from a second computing system, wherein the second computing system also executes the first key generation process to generate the first key and uses the first key to encrypt the message, wherein the first and second computing systems engage in encrypted communication without ever communicating an encryption key.

* * * * *

UNITED STATES PATENT AND TRADEMARK OFFICE
CERTIFICATE OF CORRECTION

PATENT NO. : 11,509,463 B2  
APPLICATION NO. : 16/888839  
DATED : November 22, 2022  
INVENTOR(S) : Daniel Chien Page 1 of 1

It is certified that error appears in the above-identified patent and that said Letters Patent is hereby corrected as shown below:

In the Claims

In Column 18, Line 8 (Claim 15), remove "the" before "each key generation process".

In Column 18, Line 14 (Claim 15), remove "and".

In Column 18, Line 51 (Claim 17), remove "the" before "each key generation process".

Signed and Sealed this  
Twenty-fourth Day of January, 2023

Katherine Kelly Vidal  
*Director of the United States Patent and Trademark Office*